United States Patent Office 3,517,034
Patented June 23, 1970

3,517,034
SYNTHESIS OF 4-OXA STEROIDS
Gerald W. Krakower, Elizabeth, N.J., assignor to E. R. Squibb & Sons, Inc., New York, N.Y., a corporation of Delaware
No Drawing. Filed Mar. 5, 1968, Ser. No. 710,651
Int. Cl. C07d 7/24, 9/00
U.S. Cl. 260—343.2
7 Claims

ABSTRACT OF THE DISCLOSURE

This invention relates to novel 4-oxa steroids that possess anti-estrogenic activity. The intermediates of this invention which are also novel are prepared by reacting a 17-acylated pregnane with a peracid. This intermediate can then be heated to form the end desired products.

This invention relates to compounds having the formulae:

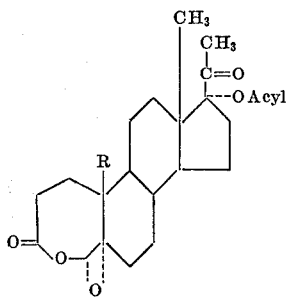

and

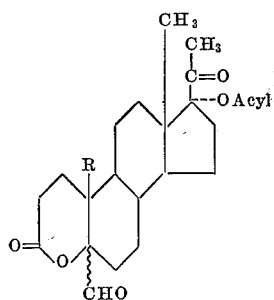

wherein R is hydrogen or methyl; acyl is a hydrocarbon carboxylic acid of less than ten carbons; and the wavy line is either alpha or beta.

The preferred acyl and acyloxy radicals are those of hydrocarbon carboxylic acids of less than twelve carbon atoms, as exemplified by the lower alkanoic acids (e.g., acetic, propionic, butyric and tert-pentanoic acid), the lower alkenoic acids, the monocyclic aryl carboxylic acids (e.g., benzoic and toluic acid), the monocyclic aryl lower alkanoic acids (e.g., phenacetic and β-phenylpropionic acid), the cycloalkane carboxylic acids and the cycloalkene carboxylic acids.

The final products of the invention possess anti-estrogenic activity and as such can be utilized in menopause and in areas of agriculture where it is desirable to control the weight of animals, e.g., hogs or capons. The compounds of this invention when utilized for such a purpose can be admixed with feed or other inert material or may be placed in injectable form and administered to the animal as disclosed and taught in U.S. Pat. No. 2,681,297. It is preferred to utilize the compounds of this invention in amounts of from about 0.025 to about 10 mg./kg., with a more desirable range being from 0.25 mg./kg. to about 7.5 mg./kg. of body weight.

The final products of this invention are prepared by utilizing a 17α-acyloxy starting material of the formula

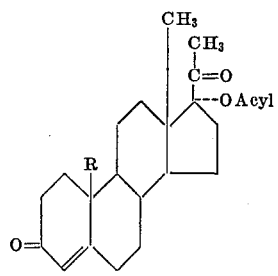

I wherein R and acyl are as defined herein. This starting material is first treated with excess of a peracid in an organic solvent to yield the products of Formula II. Suitable peracids which come within the purview of the invention are various organic peracids such as perbenzoic acid, meta-chloroperbenzoic acid, para-nitroperbenzoic acid, and so forth. Organic solvents that can be utilized in this invention are methylene chloride, ether, chloroform, benzene, and so forth.

This process yields a novel lactone intermediate of the present invention of the formula:

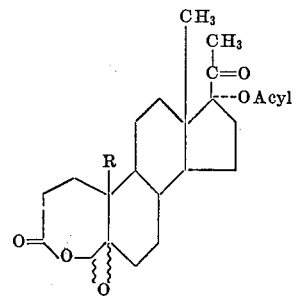

II wherein R; acyl and the wavy lines are as defined herein.

To form the desired end products of the invention the novel compound of Formula II is heated to a temperature of from about 170° to about 200° C. or to a temperature at which the crystallinity of the compound of Formula II is affected. This treatment yields the product of formula:

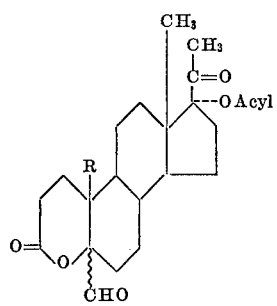

III wherein R, acyl and the wavy line are as defined above.

The products of Formula III can also be obtained by treating the new intermediates of this invention (Compound II) with acid or base. Organic, inorganic and Lewis acids may be utilized in the practice of this invention, examples of which are: hydrochloric acid, boron trifluoride and para-toluenesulfonic acid. Bases that can be utilized are alkali and alkaline earth metal hydroxides, e.g., sodium hydroxide, lithium hydroxide, calcium hydroxide, and alkali metal carbonates, e.g., sodium carbonate, and so forth.

Examples of starting materials that may be utilized in the practice of this invention are: 17α-hydroxyprogesterone, 17-acetate; 17α-hydroxyprogesterone, 17-propionate; 17α-hydroxyprogesterone, 17-caproate; 17α-hydroxyprogesterone, 17-valerate; 17α-hydroxyprogesterone, 17-benzoate; 17α-hydroxyprogesterone, 17-cyclohexanecarboxylate; 17α-hydroxyprogesterone 17-phenylacetate; 17α-hydroxy-19-norprogesterone, 17-acetate; 17α-hydroxy-19-norprogesterone, 17-propionate; 17α-hydroxy-19-norprogesterone, 17-caproate; 17α-hydroxy-19-norprogesterone, 17-valerate; 17α-hydroxy-19-norprogesterone, 17-benzoate; 17α-hydroxy-19-norprogesterone, 17-cyclohexanecarboxylate; and 17α-hydroxy-19-norprogesterone, 17-phenyl-acetate.

The following examples are illustrative of the invention. All temperatures are in degrees centigrade unless otherwise stated:

EXAMPLE 1

17α-hydroxy-4a,5-oxido-4-oxa-A-homopregnane-3,20-dione, 17-acetate

A solution of 3.00 g. of 17α-acetoxyprogesterone in 3.0 ml. of methylene chloride is treated with 6.00 g. of m-chloroperbenzoic acid and kept at room temperature for eighteen hours. The reaction mixture is then diluted with ethyl acetate and washed with the following aqueous solutions: 5% potassium iodide, 5% potassium bisulfite, saturated salt, 5% potassium bicarbonate and saturated salt. The organic solution is then dried and evaporated to give 3.3 g. of crude material. Recrystallization from methylene-chloride-ether gives a first crop of 1.311 g. of material having a double melting point of 178–180° and 268–270°. The second crop weighs 834 mg. and has a melting point of 287–292°. Analytically pure 17α-hydroxy-4a,5-oxido-4-oxa-A-homopregnane-3,20-dione, 17-acetate has a melting point 287–290°; [α]$_D$ —39° (chloroform); I.R. (KBr): 1710, 1725, 1775 cm.$^{-1}$; N.M.R.

$\tau^{SiMe_4}_{CDCl_3}$ 9.33 (s,3,18—CH$_3$)

8.79 (s,3,19-CH$_3$), 7.96 (s,3,—OCOCH$_3$), 7.85 (s,3,21—CH$_3$), 5.22 (s,1,4α—H).

*Analysis.*—Calc'd for C$_{23}$H$_{32}$O$_6$ (percent): C, 68.29; H, 7.97. Found (percent): C, 68.40; H, 7.97.

EXAMPLE 2

5-aldehydro-17α-hydroxy-4-oxa-pregnane-3,20-dione, 17-acetate

When a sample of 298 mg. of 17α-hydroxy-4a,5-oxido-4-oxa-A-homopregnane-3,20-dione, 17-acetate is heated under vacuum in a Woods metal bath, the crystals undergo a phase change at about 180°. If heating is continued for 2.5 hours, part of the material sublimes on the walls of the vessel. The sublimate weighs 72 mg. and on recrystallization from methanol-chloroform gives 14 mg. of 5-aldehydo-17α-hydroxy-4-oxa-pregnane-3,20-dione, 17-acetate, melting point 298.5–300.5°. The balance of the recovered thermally rearranged product weighs 222 mg., melting point 285–289°, and has an infrared spectrum identical with that of the recrystallized material. The analytical sample of 5-aldehydo-17α-hydroxy-4-oxa-pregnane-3,20-dione, 17-acetate has a melting point 290–292°; [α]$_D$—8.4° (chloroform); I.R. (KBr); 1701, 1712, 1735 cm.$^{-1}$.

*Analysis.*—Calc'd for C$_{23}$H$_{32}$O$_6$ (percent): C, 68.29; H, 7.97. Found (percent): C, 68.51; H, 8.02.

EXAMPLE 3

5-aldehydo-17α-hydroxy-4-oxa-pregnane-3,20-dione, 17-acetate

A suspension of 25 mg. of 17α-hydroxy-4a,5-oxido-4-oxa-A-homopregnane-3,20-dione, 17-acetate in 10 ml. of ethanol and 1.0 ml. of concentrated hydrochloric acid is refluxed for two hours. After cooling, the insoluble portion is separated and weighs 2 mg., melting point 303–305°. The solution is diluted with water and the ethanol evaporated. The aqueous suspension is extracted with ethyl acetate and the latter solution washed with saturated salt solution, dried and evaporated. Crystallization of the residue from methanol-methylene chloride gives additional amounts of 5-aldehydo-17α-hydroxy-4-oxa-pregnane-3,20-dione, 17-acetate, melting point 289–293°. The infrared spectra are identical with those of the material described in Example 2.

EXAMPLE 4

5-aldehydo-17α-hydroxy-4-oxa-pregnane-3,20-dione, 17-acetate

A solution of 25 mg. of 17α-hydroxy-4a,5-oxido-4-oxa-A-homopregnane-3,20-dione, 17-acetate in 2.5 ml. of dry benzene is treated with 0.1 ml. of borontrifluoride-etherate and stirred overnight at room temperature. The mixture is then washed with saturated salt solution, dried and evaporated to give 24 mg. of material. Recrystallization from methanol gives 11 mg. of 5-aldehydo-17α-hydroxy-4-oxa-pregnane-3,20-dione, 17-acetate, melting point 290–296°; infrared spectrum identical with that of the material described in Example 2.

EXAMPLE 5

5-aldehydo-17α-hydroxy-4-oxa-pregnane-3,20-dione, 17-acetate

Twenty-nine milligrams of 17α-hydroxy-4a,5-oxido-4-oxa-A-homopregnane-3,20-dione, 17-acetate is dissolved in 5.0 ml. of methanol and treated with 1.0 ml. of 5% aqueous potassium hydroxide. After ten minutes stirring some precipitate forms and after twenty-five minutes the reaction mixture is diluted with water and washed with methylene chloride. The clear aqueous solution is acidified with acetic acid and extracted with methylene chloride. This latter solution is washed with saturated salt solution, dried and evaporated to give 27 mg. of material. Recrystallization from methanol-methylene chloride gives 14 mg. of 5 - aldehyde - 17α-hydroxy-4-oxa-pregnane-3,20-dione, 17-acetate, melting point 284–292°; infrared spectrum identical with that of the material described in Example 2.

The invention may be variously otherwise embodied within the scope of the appended claims.

What is claimed is:

1. A compound having the formula

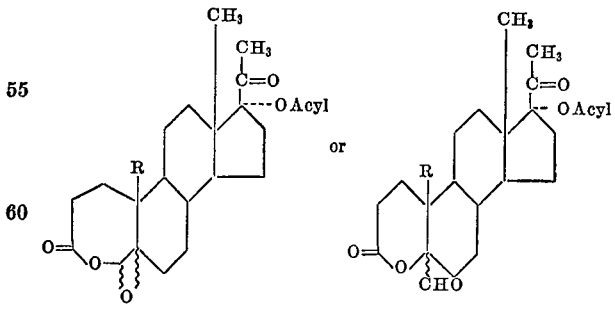

wherein R is hydrogen or methyl and acyl is a hydrocarbon carboxylic acid of less than ten carbons, and the wavy line is either alpha or beta.

2. A compound in accordance with claim 1 having the name of 17α-hydroxy-4a,5-oxido-4-oxa-A-homopregnane-3,20-dione, 17-acetate.

3. A compound in accordance with claim 1 having the name 5-aldehydo-17α-hydroxy-4-oxa-pregnane-3,20-dione, 17-acetate.

4. A process for preparing a lactone of the formula

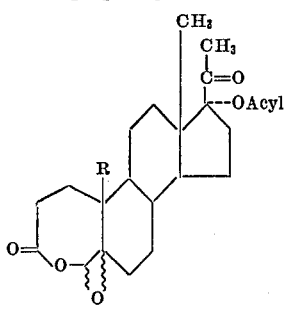

wherein R and Acyl are as defined in claim 1 which comprises treating an organic compound of the formula

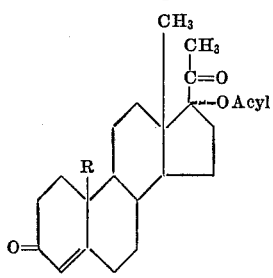

wherein R and acyl are as defined in claim 1 with an excess of a peracid.

5. A process for preparing a compound of the formula

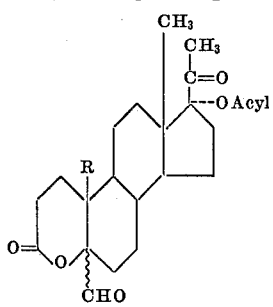

wherein R, acyl and the wavy line are as defined in claim 1 which comprises heating a compound of the formula

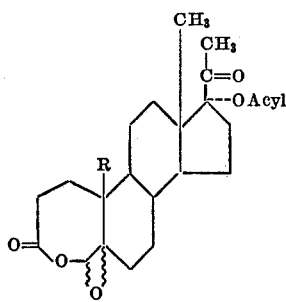

wherein R, acyl and the wavy line are as defined in claim 1.

6. A process for preparing a compound of the formula

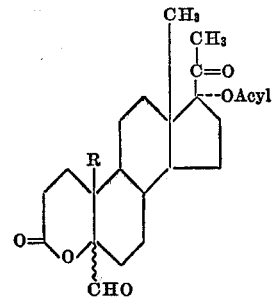

wherein R, acyl and the wavy line are as defined in claim 1 which comprises reacting with a base a compound of the formula

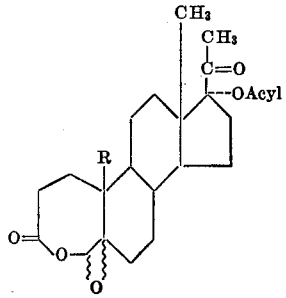

wherein R, acyl and the wavy line are as defined in claim 1.

7. A process for preparing a compound of the formula

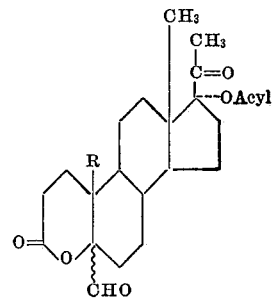

wherein R, acyl and the wavy line are as defined in claim 1 which comprises reacting with an acid a compound of the formula

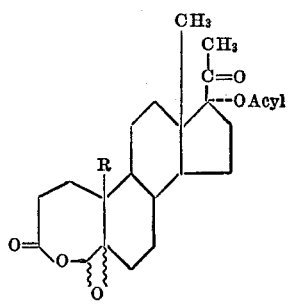

wherein R, acyl and the wavy line are as defined in claim 1.

References Cited
UNITED STATES PATENTS

| | | | |
|---|---|---|---|
| 3,284,505 | 11/1966 | Holden et al. | 260—343.2 XR |
| 3,365,466 | 1/1968 | Levine et al. | 260—343.2 |
| 3,417,106 | 12/1968 | Cross | 260—343.2 XR |

HENRY R. JILES, Primary Examiner

J. M. FORD, Assistant Examiner

U.S. Cl. X.R.

260—999

PO-1050
(5/69)

UNITED STATES PATENT OFFICE
CERTIFICATE OF CORRECTION

Patent No. 3,517,034    Dated June 23, 1970

Inventor(s) Gerald W. Krakower

It is certified that error appears in the above-identified patent and that said Letters Patent are hereby corrected as shown below:

Column 1, first formula

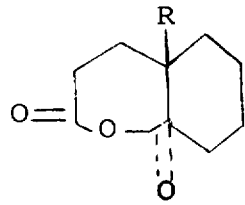   should read   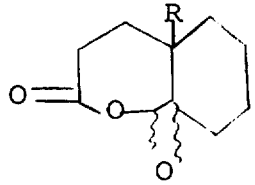

Column 4, line 42, "aldehyde" should read --aldehydo--.

SIGNED AND
SEALED
NOV 24 1970

(SEAL)
Attest:

Edward M. Fletcher, Jr.
Attesting Officer

WILLIAM E. SCHUYLER, JR.
Commissioner of Patents